ORGANIC SULFUR COMPOUNDS AND METHOD OF PRODUCTION THEREOF

Lubomir C. Vacek, Toledo, Ohio, assignor to The Sherwin-Williams Company, Cleveland, Ohio
No Drawing. Continuation-in-part of applications Ser. No. 477,011, Aug. 3, 1965, and Ser. No. 601,327, Dec. 13, 1966, the latter being a continuation-in-part of applications Ser. No. 477,030, Aug. 3, 1965, and Ser. No. 373,092, June 5, 1964. This application Nov. 6, 1968, Ser. No. 773,958
Int. Cl. C07c 154/00, 154/02, 113/04
U.S. Cl. 260—455 B        20 Claims

ABSTRACT OF THE DISCLOSURE

The invention provides new organic sulfur compounds which are organic xanthates, alkylenedixanthates, di- and trithiocarbonates and dixanthate esters which are useful as fungicides and as chemical intermediates, and a method for the production thereof. Examples of such compounds are o-methoxycarbonylphenyl ethylxanthate, bis-(o-methoxycarbonylphenyl) ethylenedixanthate, S,S-bis-(o-methoxycarbonylphenyl) dithiocarbonate, bis(o-methoxycarbonylphenyl) trithiocarbonate and 1,4-butanediol bis[(o-isopropoxy thiocarbonyl mercapto) [1] benzoate], i.e., a compound having the formula

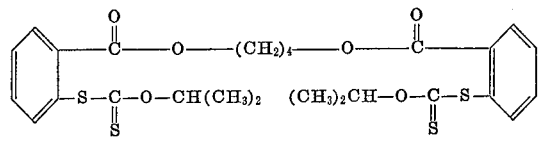

[1] So far as is known no recognized name for the moiety

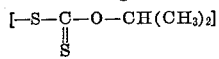

has been established, the above-suggested name uses "o-isopropoxy thiocarbonyl mercapto" for the moiety.

The method of the invention relates to the production of such organic sulfur compounds and others by reaction between aromatic diazonium cations free of hydrophilic groups and certain sulfur containing anions. The sulfur containing anions are, alkylenedixanthate, di- and trithiocarbonate, dixanthate anions, and the reaction between such anions and the aromatic diazonium cations is conducted in the presence of an amount of a solvent such as chloroform sufficient to dissolve the final organic sulfur compound and, thereby, to prevent explosion.

This application is a continuation-in-part of copending application Ser. No. 477,011, filed Aug. 3, 1965, now abandoned, and application Ser. No. 601,327, filed Dec. 13, 1966, now abandoned, the latter in turn being a continuation-in-part of application Ser. No. 477,030, filed Aug. 3, 1965, and application Ser. No. 373,092, filed June 5, 1964, both now abandoned.

It is an object of the invention to provide organic xanthate, alkylenedixanthate, di- and trithiocarbonate and dixanthate esters having the formulas indicated below. It is a further object to provide a method of producing organic xanthate, alkylenedixanthate, di- and trithiocarbonate, dixanthate, and disulfide esters and other organic sulfur compounds.

Other objects and advantages will be apparent from the description which follows, which is intended only to illustrate and disclose, and in no way to limit the invention.

DETAILED DESCRIPTION

Organic xanthate, alkylenedixanthate, di- and trithiocarbonate, dixanthate and disulfide esters produced by the method of the invention have the following formulas.

Production of xanthate and dithiocarbonate esters:

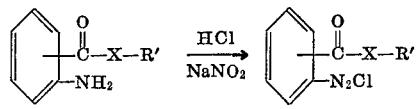

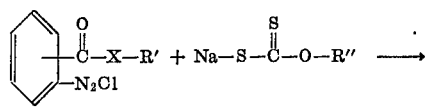

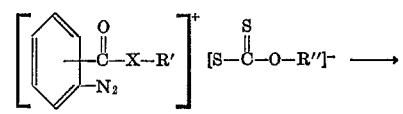

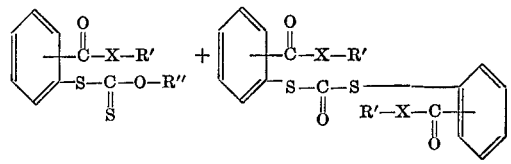

75 to 85 percent[2]        15 to 25 percent[2]

Production of alkylene-dixanthate esters:

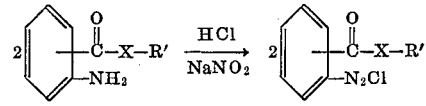

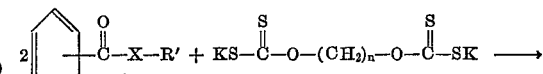

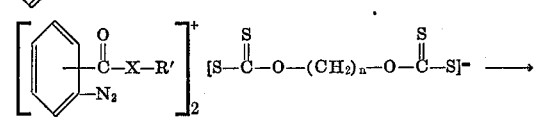

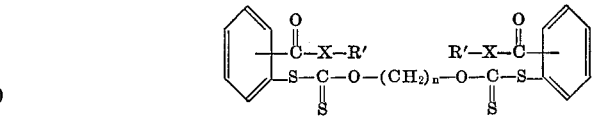

Production of trithiocarbonate esters:

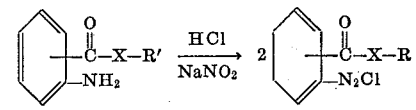

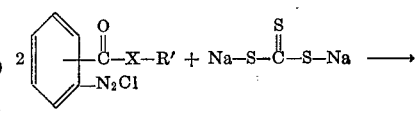

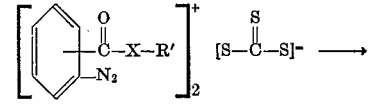

[2] The yields are based on the molecular weight of the starting amine.

N.B. as is subsequently discussed in more detail, when the starting amine is methyl anthranilate a mixture of products may be produced somewhat similar to the xanthate-dithiocarbonate mixture.

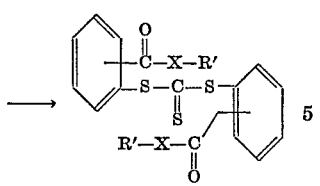

Production of dixanthate esters:

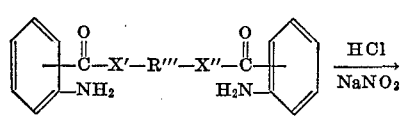

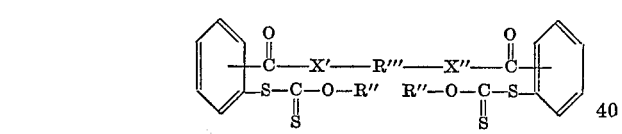

Production of disulfide esters:

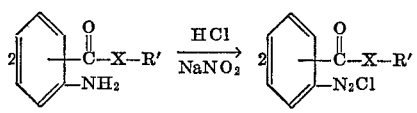

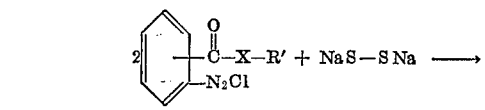

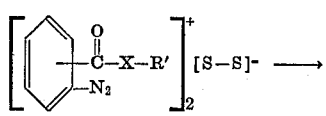

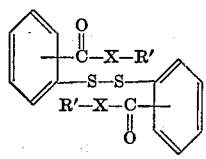

It is imperative that the reaction between aromatic diazonium cations and one of the indicated anions, for example the reactions illustrated above, be conducted in the presence of a sufficient amount of an organic solvent such as chloroform, trichloroethane, or an equivalent there- for, as subsequently discussed in more detail, for the indicated xanthate, alkylene-dixanthate, di- and trithiocarbonate, dixanthate or disulfide esters to enable the intermediate salts

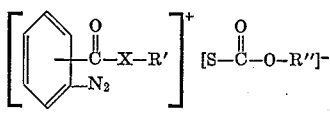

or

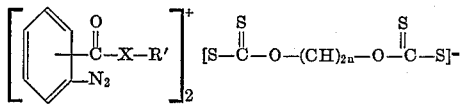

or

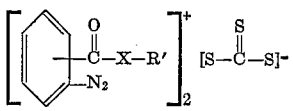

or

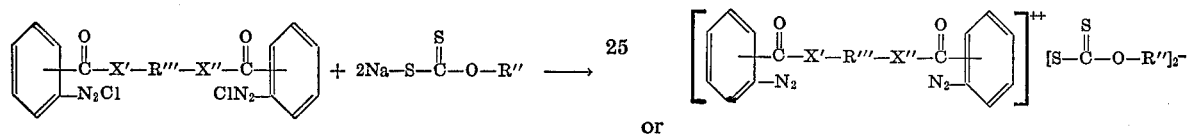

or

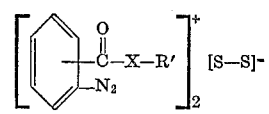

and analogous intermediate salts to remain suspended, as a finely dispersed slurry, until the reaction has taken place which produces the final esters. The salt intermediates, in the presence of the xanthate, alkylenedixanthate, di- and trithiocarbonate, dixanthate and disulfide ester final products, form water-insoluble, sticky and dangerously explosive masses, but undergo the general reactions illustrated above to produce the desired final compounds if the product is dissolved as formed and maintained in solution in chloroform, a trichloroethane, or another suitable organic solvent. The use of a solvent enables commercial scale reactions of the indicated type without danger of explosion, but is unnecessary where the aromatic amine starting material has hydrophilic groups which solubilize the final product in the aqueous reaction mixture. In general, the solvent must be one in which the final esters are soluble, and which has limited solubility with water at least to such an extent that it forms, when mixed with an aqueous phase, a separate organic phase in which the final esters are preferentially soluble relative to the aqueous phase. The solvent must be substantially unreactive with the anions, with the cations, and with the final sulfur compounds. The solvent must be used in such proportion that the separate organic phase is of sufficient volume to dissolve substantially all of the final ester product. Preferred solvents are liquid at room temperature or at the reaction temperature and, where separation of product by solvent evaporation is contemplated, can be distilled at temperatures not higher than about 100° C.–225° C. depending on the thermal stability of the product formed. In general, the amount of the solvent used should be from about 2 to about 15 milliliters per gram of product, assuming a theoretical yield. As a practical matter, the volume of the solvent phase usually should not exceed about 1½ times the volume of the aqueous phase, and the quantity of water usually ranges from about 1 to about 20 milliliters per gram of amine and sulfur donor reactants. Halogenated hydrocarbon solvents having the requisite melting and boiling characteristics, and wherein the halogen has an atomic number not greater than 35 constitute a preferred family of solvents. Such solvents, in general, are chlorinated, brominated, and fluorinated alkanes, alkenes, and aromatics. Other solvents include alkanes, ketones, esters, and ethers. Polar solvents are preferred because of indications of improved yield and product quality; about a 10 percent greater yield is achieved, for example, in chloroform than in carbon tetrachloride, other factors being equal. Examples of suitable solvents include the following chlorinated compounds and the bromine, fluorine, and mixed halogen analogues thereof: methylene chloride, chloroform, carbon tetrachloride, 1,1,2-trichloroethane, 1,1,1-trichloroethane, chloroethane, hexachloroethane, 1,1,2-trichloroethylene, trichlorobenzenes, dichlorotoluenes, 1,1,2,2-tetrachloroethylene, 1,1-dichloroethane and 1,2 - dichloroethane. Examples of other suitable solvents include hexane, methyl isobutyl ketone, methyl ethyl ketone, butyl acetate, and isopropyl ether.

The first step in producing the indicated xanthate, alkylenedixanthate, di- and trithiocarbonate, and disulfide esters involves the diazotization of an aminobenzoic acid ester or thio ester free of hydrophilic groups, i.e., groups such as —OH, —COOH, —SO$_3$H capable of solubilizing the diazonium compound and the final sulfur product in water, under the conditions which prevail during reaction, and having the general formula

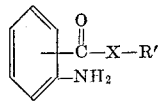

wherein X and R' have the meanings indicated above; or in producing the indicated bis xanthate esters diazotization of a di-aminobenzoic acid ester or thio ester having the general formula

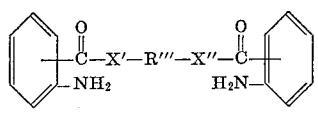

wherein X', X" and R''' have the meanings indicated above. This diazotization can conveniently be carried out in a conventional manner by adding the aminobenzoic acid ester or thio ester or the di-aminobenzoic acid ester or thio ester to be diazotized to a well stirred hydrochloric or other mineral acid solution, cooling to a temperature within the range of 0° to 10° C., and adding sodium nitrite, conveniently as an aqueous solution, until the reaction mixture gives a slightly positive starch-iodide test. The resulting diazonium salt of a mineral acid should then be maintained at a temperature about 0° to 10° C. until it is used.

In cases where the aromatic amine free of hydrophilic groups is known to be difficult to diazotize, for example where it has NO$_2$— or Cl— substituents, so that higher diazotization temperatures may be desirable, and where these high temperatures are not detrimental to the diazonium compound formed, the diazonium salt solution can be held at higher temperatures until used. Also aromatic amines which are difficult to diazotize can advantageously be dissolved in glacial acetic or commercial formic acid before addition to the hydrochloric or other mineral acid.

The reaction between (1) the diazonium salt and (2) a xanthate salt, e.g.,

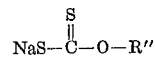

a trithiocarbonate salt, e.g.,

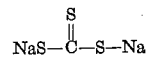

an alkylenedixanthate salt, e.g.,

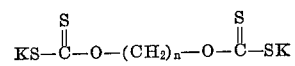

or a disulfide salt, e.g.,

is ionic. Accordingly, this reaction may be conducted in an aqueous medium. The xanthate, alkylenedixanthate, trithiocarbonate, or disulfide salt can conveniently be dissolved in water, and if desired along with a suitable buffer, such as sodium acetate, sodium carbonate, or sodium bicarbonate. Purification of this solution by filtration through activated carbon or diatomaceous silica prior to reaction is recommended when hazy solutions or solutions containing undissolved particles are obtained.

The actual reaction between the two indicated solutions is then carried out in a suitable reaction vessel containing a sufficient quantity of a suitable organic solvent, as discussed above, to dissolve the xanthate, alkylenedixanthate, trithiocarbonate, dixanthate, disulfide, or analogous ester product, and is carried out with vigorous agitation to assure effective dispersion of the intermediate salts in the mixture. Reaction temperatures ranging from about 20° C. to about 90° C. are suitable. The optimum temperature depends upon the starting materials, but temperatures within the indicated range are generally applicable. The buffer can be added to the xanthate or the like solution to neutralize any undesired excess hydrochloric or other acid and to control pH to one which will effectively direct the course of the reaction to substantially exclude other undesired competing reactions such as saponification of esters, occurring in highly caustic medium, or to a pH which will prevent decomposition of the anion, e.g., trithiocarbonate and xanthate ions are known to decompose in acid media. The reactants can conveniently be combined over an appreciable period of time, for example, by making dropwise additions to a suitable reaction vessel or by introducing streams thereof into the vessel, and in either case should be combined in substantially stoichiometric proportions. Nitrogen from the diazonium compound is evolved during the course of the reaction and constitutes a ready visual indication of completion of reaction. It is frequently convenient to make the addition of starting materials as suggested over a period of about 30 minutes, and then to allow an additional 30 minutes after charging is complete for completion of the reaction. If desired, reactants and the solvent can be charged continuously to an agitated reaction vessel while a stream of the reaction mixture is continously withdrawn from the vessel and directed successively to each of a plurality of agitated surge tanks where the reaction is allowed to proceed to completion. Alternatively, a single metering station can be used for successively charging reactants and the solvent to each of a plurality of agitated reaction vessels in each of which the reaction is allowed to proceed to completion.

After reaction is complete, the organic solvent phase is separated from the aqueous phase, e.g., by decantation, and the final ester product is recovered by elimination of the solvent, for example, by distillation. The crude product can then be purified as may be required for the final use contemplated.

DESCRIPTION OF THE PREFERRED EMBODIMENTS

The following examples are intended only to illustrate and disclose, and in no way to constitute a limitation upon the invention.

EXAMPLE 1

Preparation of o-methoxycarbonylphenyl ethylxanthate and S,S-bis(o-methoxycarbonylphenyl) dithiocarbonate An o-methoxycarbonylphenyldiazonium chloride solution was first prepared as a reactant by vigorously stirring 47.2 g. methyl anthranilate, at room temperature, into a well stirred solution of 53.3 cc. concentrated (35 percent)[3] hydrochloric acid in 380 cc. water, cooling the resulting reaction mixture to a temperature of about 0–5° C., and making dropwise additions of a cool, two-normal solution of sodium nitrite until a slightly positive starch-iodide test was noted. The reaction mixture was maintained at a temperature of about 0–5° C. during the dropwise additions of the sodium nitrite solution, and until used as described below.

A potassium ethylxanthate solution was prepared as a second reactant by dissolving 50.2 g. purified potassium ethylxanthate and 7.6 g. sodium bicarbonate in 300 cc. water. The resulting solution was filtered through activated carbon and maintained at room temperature of about 20° C. until used as described below.

A 2-liter glass reaction vessel was charged with 300 cc. chloroform and 50 cc. water. The chloroform and water were then heated to a temperature within the range of 50 to 55° C. Vigorous stirring of the reaction vessel contents was commenced and continued until completion of reaction as hereinafter described. The reaction vessel contents were maintained at a temperature within the indicated range until completion of reaction.

Separate, dropwise additions at substantially equimolecular rates of the o-methoxycarbonyl-phenyldiazonium chloride solution and of the potassium ethylxanthate solution were then made to the reaction vessel over a period of about 20 minutes. Reaction was allowed to continue for approximately an additional 30 minutes. During the additions of the reactant solutions, nitrogen evolution was vigorous, but diminished to zero about 15 minutes after completion of the solution additions. The reaction mixture was then cooled to room temperature. The chloroform layer was separated from the aqueous layer by decantation, filtered through activated carbon, and then dried by contact with anhydrous sodium sulfate. The chloroform solvent was then removed by distillation at a temperature within the range of 50° C. to 70° C., first at atmospheric pressure and then under moderately reduced pressure. A crude mixture of o-methoxycarbonylphenyl ethylxanthate and S,S-bis(o-methoxycarbonylphenyl) dithiocarbonate remained after distillation of the chloroform. This crude mixture, which was a yellow oil, was dissolved in 100 cc. commercial methanol. The resulting solution was allowed to stand for approximately 12 hours at 0–5° C., during which time the S,S-bis(o-methoxycarbonylphenyl) dithiocarbonate crystallized quantitatively as light yellow crystals. The crystals were recovered from the methanol solution of o-methoxycarbonylphenyl ethylxanthate by filtration, were washed with 20 cc. methanol, dried, and were again recrystallized from 100 cc. methanol. The recrystallized S,S-bis(o-methoxycarbonylphenyl) dithiocarbonate had a melting point from 79.5–80.5° C.; the total recovery thereof was 11.13 grams which is 20.4 percent of theory, based upon methyl anthranilate.

The o-methoxycarbonylphenyl ethylxanthate was recovered from the methanol solution thereof by heating at a temperature within the range of 50° C. to 70° C., first at atmospheric pressure and then under moderately reduced pressure, to distill the methanol. The final recovery was 57.8 grams of o-methoxycarbonylphenyl ethylxanthate, corresponding to 75.1 percent of theory, based upon methyl anthranilate, a yellow oily liquid which resisted crystallization. The o-methoxycarbonylphenyl ethylxanthate and the S,S-bis(o-methoxycarbonylphenyl) dithiocarbonate were identified by their chemical reactions.

EXAMPLE 2

Preparation of m-trifluoromethylphenyl isopropylxanthate

A solution of m-trifluoromethylphenyldiazonium chloride was first prepared as a reactant by vigorously stirring 32.2 g. of m-trifluoromethylaniline at room temperature, into 100 cc. of glacial acetic acid. To this solution was added in one shot a well stirred solution of 88 cc. of 5 N hydrochloric acid. The temperature of the resulting clear solution reached 30° C. It was then cooled to 10° C. and the cooling was accompanied by some separation from the solution of the m-trifluoromethylaniline hydrochloride in the form of fine white crystals. This slurry was diazotized at a temperature of 10–20° C. by making dropwise additions of a sodium nitrite solution, prepared by dissolving 14 g. of sodium nitrite in 40 cc. of water, until a slightly positive starch iodide test was noted. A clear light yellowish-brown solution of the m-trifluoromethylphenyldiazonium compound was formed. Water was added to bring the total volume to 300 cc., and the resulting solution was kept in an ice bath until used as described below.

A solution of sodium isopropylxanthate was prepared as a second reactant by dissolving at room temperature 39.12 g. of technical sodium isopropylxanthate (assay 83.7 percent), and 6.4 g. of sodium carbonate in 100 cc. of water. The solution was then filtered through diatomaceous silica and its volume was brought to 150 cc. by the addition of water.

A 2-liter glass reaction vessel was charged with 200 cc. of 1,1,2-trichloroethane and 50 cc. of water. The temperature of the reaction vessel was kept within the range of 10 to 15° C. until the reaction was completed. Vigorous stirring of the reaction vesel contents was commenced and continued until completion of reaction and for an additional 20 minutes as hereinafter described. Steady streams of the m-trifluoromethylphenyldiazonium solution and of the isopropylxanthate solution were introduced into the reaction vessel in a ratio by volume of 2 to 1.

The formation of yellow solids was observed during the addition of the reactants. These yellow solids comprising the highly unstable salt of the diazonium cation with the xanthate anion decomposed rapidly with the vigorous release of gaseous nitrogen and formation of the product soluble in the organic solvent. This evolution of nitrogen continued for only 2 minutes after the end of the charging of the reactants. The temperature of the reaction mixture was then raised to 40° C. and held for 20 minutes. The reaction mixture was then transferred to a separatory funnel; and the lower organic phase was then separated from the aqueous phase, washed twice with water, and dried by contact with anhydrous sodium sulfate. The trichloroethane solvent was then removed by vacuum distillation at a temperature no higher than 60° C. The residual amber colored oil was identified by infrared spectroscopy as m-trifluoromethylphenyl isopropylxanthate along with a small amount of S,S-bis(m-trifluoromethylphenyl) dithiocarbonate. The yield was 32 g. or 66 percent of theory based on the initial weight of m-trifluoromethylaniline used.

---
[3] The terms "percent" and "parts" are used herein and in the appended claims to refer to percent and parts by weight, unless otherwise indicated.

EXAMPLE 3

Preparation of bis(o-methoxycarbonylphenyl) ethylenedixanthate

An o-methoxycarbonylphenyldiazonium chloride solution was first prepared as a reactant by virorously stirring a dispersion of 30.3 g. methyl anthranilate in 88 cc. water into 88 cc. 5 N hydrochloric acid at room temperature, cooling the resulting reaction mixture to a temperature of about 0–5° C., and making dropwise additions of a cool, two-normal solution of sodium nitrate until a slightly positive starch-iodide test was noted. The reaction mixture was maintained at a temperature of about 0–5° C. during the dropwise additions of the sodium nitrate solution, and until used as described below.

A dipotassium ethylenedixanthate solution was prepared as a second reactant by dissolving 32.2 g. dipotassium ethylenedixanthate in 300 cc. water at 50–60° C. The resulting solution was filtered through activated carbon and maintained at a temperature of 50–60° C. until used as described below.

A 2-liter glass reaction vessel was charged with 200 cc. chloroform and a solution of 8.2 g. sodium acetate trihydrate in 50 cc. water. The chloroform and sodium acetate solution was then heated to a temperature within the range of 45 to 50° C. Vigorous stirring of the reaction vessel contents was commenced and continued until completion of reaction as hereinafter described. The reaction vesel contents were maintained at a temperature within the indicated range until completion of reaction.

Separate, dropwise additions of the o-methoxycarbonylphenyldiazonium chloride and the dipotassium ethylenedixanthate solutions were then made to the reaction vessel at rates so as to maintain a molar ratio of o-methoxycarbonylphenyldiazonium chloride to dipotassium ethylenedixanthate of substantially 2 to 1. The additions required approximately 30 minutes. The reaction was allowed to continue for approximately an additional 20 minutes while the temperature was maintained at 45–50° C. The warm chloroform layer was separated from the aqueous layer by decantation, washed with 3 successive 100 cc. aliquots of 75 percent sulfuric acid and then washed with 3 successive 150 cc. aliquots of water. The yellow, washed, chloroform solution was dried by contact with molecular sieves. The chloroform solvent was then removed by distillation under moderately reduced pressure; the final pot temperature was 60° C. The remaining bis-(o-methoxycarbonylphenyl) ethylenedixanthate was of good quality. The yield was 38.9 g., approximately 80.8 percent of theory based on the methyl anthranilate used. The ethylenedixanthate ester was identified by its chemical reactions.

EXAMPLE 4

Preparation of o-cyclohexyloxycarbonylphenyl isopropylxanthate and bis(o-cyclohexyloxycarbonylphenyl) dithiocarbonate An o-cyclohexyloxycarbonylphenyldiazonium chloride solution was prepared as a first reactant by vigorously stirring 219.29 g. of cyclohexyl anthranilate, at room temperature, into a well stirred solution of 440 cc. concentrated (35 percent) hydrochloric acid in 440 cc. water, and 200 cc. glacial acetic acid. The resulting reaction mixture was cooled to a temperature of 5° C., and dropwise additions were made of a cool, six-normal solution of sodium nitrite until a slightly positive starch-iodide test was noted. The solution of the o-cyclohexyloxycarbonylphenyldiazonium chloride was treated with 5 g. activated carbon, stirred for 15 minutes, and filtered through a filter precoated with diatomaceous silica. Water was then added to adjust the volume of the filtered solution to 1600 cc. The solution was maintained at a temperature of about 5°–10° C. during diazotization, and until used as described below.

A sodium isopropylxanthate solution was prepared as a second reactant by dissolving 216.5 g. technical sodium isopropylxanthate (assay 75.3 percent) and 41.0 g. sodium acetate trihydrate in 300 cc. water. The solution was treated with 1 g. activated carbon, stirred for 10 minutes, and filtered through a filter precoated with diatomaceous silica. This solution was diluted to 600 cc. by the addition of water and was kept at a temperature of 20°–25° C. until used.

A 4-liter glass reaction vessel was charged with 600 cc. chloroform at room temperature of about 25° C. Vigorous stirring of the reaction vessel contents was commenced and continued throughout the charging of reactants and for an additional 30 minutes after charging thereof. Increments amounting to 160 cc. of the o-cyclohexyloxycarbonylphenyldiazonium chloride solution and 60 cc. of the sodium isopropylxanthate solution were charged simultaneously and periodically into the reaction vessel over a period of 20 minutes. After the first charges, the temperature of the reaction mixture rose from 25° C. to 37° C. A temperature of 35°–40° C. was maintained throughout the charging and for the additional 30 minute stirring period.

The reaction mixture was transferred to a separatory funnel; and the lower organic phase was separated from the aqueous phase, washed twice with water, and dried overnight by contact with anhydrous sodium sulfate. The chloroform solvent was removed by vacuum distillation at a pot temperature not exceeding 40° C.

The orange oil residue amounting to 318 g. was dissolved in 3500 cc. petroleum ether, and the solution was placed in a refrigerator and kept at a temperature of 5° C. for three days. At the end of this period, the bis (o-cyclohexyloxycarbonylphenyl) dithiocarbonate crystallized quantitatively as slightly yellowish crystals. The The crystals were recovered from the petroleum ether solution by filtration, and the filtrate was set aside. The crystals, which amounted to 48.0 g., were dried at 60° C. and recrystallized from acetone. The product, which was pure bis(o-cyclohexyloxycarbonylphenyl) dithiocarbonate, amounted to 41.0 g. and had a corrected melting point of 81.0°–81.4° C. The dithiocarbonate product was identified by its reactions, by elemental assay, by Infrared Spectroscopy, and by Nuclear Magnetic Resonance.

The filtrate which had been set aside was subjected to vacuum distillation at a pot temperature not exceeding 40° C. in order to remove the petroleum ether solvent from the dissolved isopropylxanthate ester. The final recovery was 300 g. of orange oil which was technically pure o-cyclohexyloxycarbonylphenyl isopropylxanthate.

A chemically pure o-cyclohexyloxycarbonylphenyl isopropylxanthate was prepared from the technical product obtained above by the following procedure.

The technical o-cyclohexyloxycarbonylphenyl isopropylxanthate was subjected to repeated falling film distillations at an absolute pressure of 2 mm. Hg or less, and at a temperature not exceeding 70° C. The collected volatile fraction contained a mixture of cyclohexylbenzoate and trichloromethyl isopropylxanthate. The non-volatile oil residue was dissolved in petroleum ether and subjected to chromatographic separation on a column of aluminum oxide. Small quantities of impurities such as bis(o-cyclohexyloxycarbonylphenyl) disulfide, bis(isopropyloxythiocarbonyl) disulfide, color bodies, and remaining trichloromethyl isopropylxanthate and bis(o-cyclohexyloxycarbonylphenyl) dithiocarbonate were then separated easily by a subsequent eluation process.

The identity and high purity of the o-cyclohexyloxycarbonylphenyl isopropylxanthate thus obtained was confirmed by elemental analysis, Infrared Spectroscopy, and Nuclear Magnetic Resonance.

The same process was also used to prepare chemically pure o-methoxycarbonylphenyl isopropylxanthate and o-phenoxycarbonylphenyl isopropylxanthate from the technical products obtained after the separation of corresponding bis(o-methoxycarbonylphenyl)dithiocarbonate and bis(o-phenoxycarbonylphenyl) dithiocarbonate crystals. The chemical purity of these compounds was confirmed analytically.

Similarly, other technical products obtained according to this invention may also be purified by following the above-described purification procedure.

EXAMPLE 5

Preparation of bis(o-methoxycarbonylphenyl) trithiocarbonate

A solution of o-methoxycarbonylphenyldiazonium chloride was prepared as a first reactant by vigorously stirring 151.2 g. of methyl anthranilate into 440 cc. of 5 N hydrochloric acid at room temperature. The resulting solution was cooled to 2° C. and the resulting slurry was diazotized at a temperature of 2° C. to 6° C. by making dropwise additions of a 2 N sodium nitrite solution over a period of about 30 minutes until a slightly positive starch iodide test was noted. The solution of the diazonium chloride was cooled to 0° C. and the excess of hydrochloric acid was neutralized by adding very slowly to the well stirred solution of the diazonium chloride, 40 cc. of a 5 N solution of sodium hydroxide. The temperature was kept in the range of 0°±2° C. throughout the neutralization. The volume of the solution was then raised to 1200 cc. by the addition of water and kept in an ice bath until used.

A solution of sodium trithiocarbonate was prepared as a second reactant by dissolving at room temperature 100 g. of sodium trithiocarbonate (assay 81.2 percent) in 250 cc. of water. The volume of the resulting solution was raised to 600 cc. by the addition of water.

A 4-liter glass reaction vessel was charged with 750 cc. of commercial trichlorobenzene and 500 cc. of water along with 40.8 g. of sodium acetate trihydrate. The vessel contents were then heated to a temperature in the range of 50° to 55° C. and were held at a temperature within this range for the whole charging time of about 30 minutes and for an additional 20 minutes after charging. Vigorous stirring of the reaction vessel contents was commenced and continued throughout the charging and for the additional 20 minutes as hereinafter described. Increments of 100 cc. of the o-methoxycarbonylphenyldiazonium chloride solution and 50 cc. of the sodium trithiocarbonate solution were charged simultaneously and periodically into the reaction vessel over a period of about 30 minutes. The formation of the characteristic orange-yellow solids could be seen during the charging of the reactants, which soon after rapidly decomposed with the vigorous release of nitrogen and the formation of the product which was soluble in the organic solvent. When charging was complete, the reaction mixture was held for an additional 20 minutes at a temperature within the range of 50° to 55° C. At the end of this time, the reaction mixture was transferred to a separatory funnel; and the lower organic phase was separated from the aqueous phase, washed twice with water, and dried by contact with anhydrous sodium sulfate. The final solution contained 131.0 g. of bis(o-methoxycarbonylphenyl) trithiocarbonate which amounted to approximately 69 percent of theory. The product was not isolated; identity and yield were determined by further reaction.

EXAMPLE 6

Preparation of bis(o-methoxycarbonylphenyl) disulfide

A solution of o-methoxycarbonylphenyldiazonium chloride was first prepared as a reactant by vigorously stirring 151.2 g. of methyl anthranilate into 440 cc. of 5 N hydrochloric acid at room temperature. The resulting solution was cooled to 2° C. and the resulting slurry was diazotized at a temperature of 2 to 6° C. by making dropwise additions of a 2 N sodium nitrite solution over a period of about 30 minutes until a slightly positive starch iodide test was noted. The solution of the diazonium chloride was cooled to 0° C. and the excess of hydrochloric acid was neutralized by adding very slowly to the well stirred solution of the diazonium chloride, 40 cc. of a 5 N solution of sodium hydroxide. The temperature was kept in the range of 0±2° C. throughout the neutralization. The volume of the solution was then raised to 1200 cc. by the addition of water, and held in an ice bath until used as described below.

A solution of sodium disulfide was prepared as a second reactant by dissolving 68.3 g. (assay 60 percent) of commercial sodium sulfide was 17.6 g. of sulfur powder in 120 cc. of water at 60° C. The resulting solution of sodium disulfide was cooled to room temperature and its volume was raised to 600 cc. by the addition of water.

A 4-liter glass reaction vessel was charged with 1500 cc. of commercial trichlorobenzene and 500 cc. of water along with 34.0 g. sodium acetate trihydrate. The temperature of the reaction vessel contents was kept in the temperature range of 50 to 55° C. during the 20 minutes required for addition of reactants and for 30 minutes after the addition. Vigorous stirring of the reaction vessel contents was commenced and continued throughout the addition of reactants and for the additional 30 minutes as hereinafter described. Steady streams of the o-methoxycarbonylphenyldiazonium chloride solution and of the sodium disulfide solution were charged into the reaction vessel in a ratio by volume of 2 to 1. During the addition of the reactants there could be observed the formation of orange-yellow solids which soon after decomposed rapidly with the vigorous release of gaseous nitrogen and formation of the product which was soluble in the organic solvent. When charging was complete, the reaction mixture was held at the temperature of 50 to 55° C. for an additional 30 minutes. At the end of this time, the reaction mixture was transferred to a separatory funnel; and the lower organic phase was separated from the aqueous phase, washed twice with water, and dried by contact with anhydrous sodium sulfate. The final solution contained 97.0 g. of bis-(o-methoxycarbonylphenyl) disulfide amounting to 58 percent of theory. The product was not isolated; identity and yield were determined by further reaction.

EXAMPLE 7

Preparation of bis(m-trifluoromethylphenyl) disulfide

A solution of m-trifluoromethylphenyldiazonium chloride was first prepared as a reactant by vigorously stirring 32.2 g. of m-trifluoromethylaniline at room temperature, into 100 cc. of glacial acetic acid. To this solution was added in one shot, with vigorous stirring, a solution of 88 cc. of 5 N hydrochloric acid. The temperature of the resulting clear solution reached 30° C. It was then cooled to 10° C. and the cooling was accompanied by some separation from the solution of the amine hydrochloride in the form of fine white crystals. This slurry was diazotized at a temperature of 10-20° C. by making dropwise additions of a solution of 14 g. of sodium nitrite in 40 cc. of water until a slight positive starch iodide test was noted. A clear light yellowish-brown solution of the diazonium compound was formed. Water was added to bring the total volume to 300 cc., and the resulting solution was cooled in an ice bath until used as described below.

A solution of sodium disulfide was prepared as a second reactant by dissolving at 60° C., 14.3 g. of commercial sodium sulfide and 3.87 g. sulfur powder in 25 cc. of water. To this solution was added 104 cc. of a 50 percent by weight solution of sodium hydroxide. The resulting solution was cooled to room temperature and diluted to 300 cc. by the addition of water.

A 2-liter glass reaction vessel was charged with 200 cc. of 1,1,2-trichloroethane and 50 cc. of water. The temperature of the reaction vessel contents was kept in the range of 10–20° C. during the 20 minutes required for charging the reactants. Vigorous stirring of the reaction vessel contents was commenced and continued until completion of the reaction and during an additional 15 minutes as hereinafter described. Steady streams of the m-trifluoromethylphenyldiazonium chloride solution and of the disulfide solution were charged into the reaction vessel in a ratio by volume of 1 to 1. The formation of yellow solids was observed during the addition of the reactants. These solids decomposed rapidly after formation with the vigorous release of nitrogen and formation of the product which was soluble in the organic solvent. The reaction was complete a few minutes after the end of the charging of the reactants. The temperature of the reaction mixture was then raised to 40° C. and held for 15 minutes. The hot reaction mixture was transferred to a separatory funnel; and the lower organic phase was separated from the aqueous phase, washed twice with water, and dried by contact with anhydrous sodium sulfate. The trichloroethane solvent was removed from the solution by vacuum distillation at a pot temperature not greater than 60° C. The residue was then subjected to a vacuum distillation; the fraction collected at 165–175° C. at 20 mm. Hg in the form of a yellow oil was identified by infrared spectroscopy as the desired product, bis(m-trifluoromethylphenyl) disulfide. The yield obtained was of a good purity and amounted to 20 g. or 56.5 percent of theory.

EXAMPLE 8

Preparation of m-methoxycarbonylphenyl ethylxanthate

A solution of m-methoxycarbonylphenyldiazonium chloride was first prepared as a reactant by vigorously stirring 37.5 g. of methyl m-aminobenzoate hydrochloride into 48 cc. of 5 N hydrochloric acid and 128 cc. of water. The clear, light yellow solution which was obtained was cooled to 5° C. and diazotized at 5–10° C. by making dropwise additions of a 6 N sodium nitrite solution over a period of about 30 minutes, until a slightly positive starch iodide test was noted. The solution was then diluted to 300 cc. with water and kept in an ice bath until used.

A solution of potassium ethylxanthate was prepared as a second reactant by dissolving 40 g. of potassium ethylxanthate (assay 82.6 percent) and 8.2 g. of sodium acetate trihydrate in 100 cc. of water. The solution was filtered through diatomaceous silica and the volume was raised to 150 cc. by addition of water.

A 1-liter glass reaction vessel was charged with 150 cc. of 1,2-dichloroethane and 50 cc. of water. The vessel contents were maintained at a temperature in the range of 20 to 25° C. and held throughout the charging period and for an additional 30 minutes after charging. Vigorous stirring of the reaction vessel contents was commenced and continued throughout the charging and for the additional 30 minutes after charging. Steady streams of the m-methoxycarbonylphenyldiazonium chloride solution and of the potassium ethylxanthate solution were charged into the reaction vessel in a ratio by volume of 2 to 1. The formation of yellow solids could be seen during the charging of the reactants, which soon after rapidly decomposed with the vigorous release of nitrogen and the formation of the product which was soluble in the organic solvent. Evolution of nitrogen ceased approximately 5 minutes after the end of the charging period. When charging was complete, the reaction mixture was held for an additional 30 minutes at a temperature within the range of 20 to 25° C. At the end of this time, the reaction mixture was transferred to a separatory funnel, and the lower organic phase was separated from the aqueous phase, washed twice with water, and dried by contact with anhydrous sodium sulfate. The dichloroethane was removed from the dry solution by vacuum distillation at pot temperatures not exceeding 30° C. The pot residue in the form of an amber colored oil was identified by infrared spectroscopy as the desired m-methoxycarbonylphenyl ethylxanthate containing small amounts of S,S-bis(m-methoxycarbonylphenyl) dithiocarbonate and probably also S-ethyl-S-(m-methoxycarbonylphenyl) dithiocarbonate, isomeric with the desired product. A main impurity found in the final product is bis(ethoxythiocarbonyl) disulfide formed by the oxidation of the excess ethylxanthate used in the reaction. Its presence explains the over-theoretical yield of the isolated crude product amounting to 55.1 g. which corresponds to 108 percent of theory based on the initial weight of methyl m-aminobenzoate.

EXAMPLE 9

Preparation of p-ethoxycarbonylphenyl isopropylxanthate

A solution of p-ethoxycarbonylphenyldiazonium chloride was first prepared as a reactant by vigorously stirring at a temperature of 50° C., 33.0 g. of ethyl p-aminobenzoate into 200 cc. of a 50 percent by weight solution of glacial acetic acid in water. To this solution was added 88 cc. of 5 N hydrochloric acid. The resulting solution of the amine hydrochloride was cooled to 3° C. and diazotized at 3 to 7° C. by making dropwise additions of a 2 N solution of sodium nitrite until a slightly positive starch-iodide test was noted. The solution of the diazonium chloride was treated with 2 g. of activated carbon giving a slightly yellowish, clear solution of the diazonium chloride. The solution was diluted with water to 640 cc. and kept in an ice bath until used.

A solution of sodium isopropylxanthate was prepared as a second reactant by dissolving 39.12 g. of sodium isopropylxanthate (assay 83.3 percent) and 13.6 g. of sodium acetate trihydrate in 200 cc. of water. The volume of this solution was raised to 320 cc. by addition of water.

A 2-liter glass reaction vessel was charged with 200 cc. of chloroform and 100 cc. of water and heated to a temperature of 40–45° C. which temperature was maintained throughout the charging and for an additional 30 minutes. Virgorous stirring of the reaction vessel contents was commenced and continued throughout the charging and for the additional 30 minutes after charging. Increments amounting to 40 cc. of p-ethoxycarbonylphenyldiazonium chloride and 20 cc. of the sodium isopropylxanthate solution were charged into the reaction vessel over a period of 15 minutes. After charging, the reaction mixture was kept at 40–45° C. for an additional 30 minutes.

The reaction mixture was transferred to a separatory funnel; and the lower organic phase was separated from the aqueous phase, washed twice with water, and dried by contact with anhydrous sodium sulfate. The chloroform solvent was removed by vacuum distillation at a temperature not exceeding 40° C. The reddish-orange oil obtained was identified mainly as p-ethoxycarbonylphenyl isopropylxanthate with about 15 percent by weight of S,S,-bis(p-ethoxycarbonylphenyl) dithiocarbonate. Based on the starting weight of ethyl p-aminobenzoate the 54.0 g. of this mixture obtained represented about 101.0 percent of the theoretical yield. This over-theoretical yield is caused by the presence of small amounts of bis(isopropoxythiocarbonyl) disulfide derived by oxidation from the excess xanthate used in this reaction.

Generally the procedure described in Example 1 has also been used to produce other sulfur containing ester compounds by diazotizing various amines and reacting the resulting diazonium compounds with various xanthates. Typical amines diazotized, typical xanthates or nucleophilic substitution agents,[4] and the resulting final products are presented in Table I, chloroform was used as a solvent to dissolve the final sulfur compound and sodium acetate was used as a buffer for the reaction between the diazonium compounds and the xanthates.

---

[4] Nucleophilic substitution agents are characterized by an unshared pair of electrons. For a comprehensive discussion of nucleophilic substitution agents see Organic Chemistry. Morrison and Boyd, Allyn and Bacon, Inc., Boston, 1962, pp. 366–384.

TABLE I

CHCl₃ solvent-sodium acetate buffer

| Example | Final compound by structural formula | Amine diazotized | Nucleophilic substitution agent |
|---|---|---|---|
| 10 | methyl 2-(S-C(=S)-O-(CH₂)₁₁-CH₃) benzoate | methyl anthranilate | Na-S-C(=S)-O-(CH₂)₁₁-CH₃ |
| 11 | methyl 2-(S-C(=S)-O-CH₂-CH=CH₂) benzoate | methyl anthranilate | K-S-C(=S)-O-CH₂-CH=CH₂ |
| 12 | methyl 2-(S-C(=S)-O-CH(CH₂CH₃)(CH₂CH₃)) benzoate | methyl anthranilate | Na-S-C(=S)-O-CH(CH₂CH₃)(CH₂CH₃) |
| 13 | methyl 2-(S-C(=S)-O-CH₂CH₂-O-CH₃) benzoate | methyl anthranilate | K-S-C(=S)-O-CH₂CH₂-O-CH₃ |
| 14 | methyl 2-(S-C(=S)-O-CH₂-C₆H₅) benzoate | methyl anthranilate | K-S-C(=S)-O-CH₂-C₆H₅ |
| 15 | methyl 2-(S-C(=S)-O-CH(CH₃)₂) benzoate | methyl anthranilate | Na-S-C(=S)-O-CH(CH₃)₂ |
| 16 | ethyl 2-(S-C(=S)-O-CH(CH₃)₂) benzoate | ethyl anthranilate | Na-S-C(=S)-O-CH(CH₃)₂ |
| 17 | propyl 2-(S-C(=S)-O-CH₂-CH(CH₃)₂) benzoate | propyl anthranilate | Na-S-C(=S)-O-CH₂-CH(CH₃)₂ |

TABLE I—Continued

CHCl₃ solvent-sodium acetate buffer

| Example | Final compound by structural formula | Amine diazotized | Nucleophilic substitution agent |
|---|---|---|---|
| 18 | benzene ring with –O–C(=O)–CH(CH₃)₂ (actually CH(CH₃)–CH₃ branched) and –S–C(=S)–O–CH(CH₃)₂ | anthranilic acid isopropyl ester (–C(=O)–O–CH(CH₃)₂ with NH₂) | Na–S–C(=S)–O–CH(CH₃)₂ |
| 19 | benzene with –O–C(=O)–CH(CH₃)–CH₂–CH₃ and –S–C(=S)–O–CH(CH₃)₂ | anthranilate sec-butyl ester | Na–S–C(=S)–O–CH(CH₃)₂ |
| 20 | benzene with –C(=O)–S–(CH₂)₃–CH₃ and –S–C(=S)–O–CH(CH₃)₂ | S-butyl thioanthranilate | Na–S–C(=S)–O–CH(CH₃)₂ |
| 21 | benzene with –C(=O)–O–CH(cyclohexyl part: CH₂–CH₂–CH₂–CH₂–CH₂) and –S–C(=S)–O–CH(CH₃)₂ | cyclohexyl anthranilate | Na–S–C(=S)–O–CH(CH₃)₂ |
| 22 | benzene with –C(=O)–O–CH₂–C₆H₅ and –S–C(=S)–O–CH(CH₃)₂ | benzyl anthranilate | Na–S–C(=S)–O–CH(CH₃)₂ |
| 23 | benzene with –C(=O)–S–(CH₂)₁₁–CH₃ and –S–C(=S)–O–CH(CH₃)₂ | S-dodecyl thioanthranilate | Na–S–C(=S)–O–CH(CH₃)₂ |
| 24 | benzene with –C(=O)–O–CH₂–CH=CH₂ and –S–C(=S)–O–CH(CH₃)₂ | allyl anthranilate | Na–S–C(=S)–O–CH(CH₃)₂ |

TABLE I—Continued
CHCl₃ solvent-sodium acetate buffer

| Example | Final compound by structural formula | Amine diazotized | Nucleophilic substitution agent |
|---|---|---|---|
| 25 | (CH₃)₂CH—O—C(=S)—S—[C₆H₄]—C(=O)—O—CH₂—CH₂—O—C(=O)—[C₆H₄]—S—C(=S)—O—CH(CH₃)₂ | H₂N—[C₆H₄]—C(=O)—O—CH₂—CH₂—O—C(=O)—[C₆H₄]—NH₂ | Na—S—C(=S)—O—CH(CH₃)₂ |
| 26 | O=C(—[C₆H₄]—S—C(=S)—O—CH(CH₃)₂)—O—CH₂—CH₂—O—CH₃ | O=C(—[C₆H₄]—NH₂)—O—CH₂—CH₂—O—CH₃ | Na—S—C(=S)—O—CH(CH₃)₂ |
| 27 | O=C(—[C₆H₄]—S—C(=S)—O—CH(CH₃)₂)—O—[C₆H₅] | O=C(—[C₆H₄]—NH₂)—O—[C₆H₅] | Na—S—C(=S)—O—CH(CH₃)₂ |
| 28 | O=C(—[C₆H₄]—S—C(=S)—O—CH(CH₃)₂)—S—[C₆H₅] | O=C(—[C₆H₄]—NH₂)—S—[C₆H₅] | Na—S—C(=S)—O—CH(CH₃)₂ |
| 29 | O=C(—[C₆H₄]—S—C(=S)—O—CH(CH₃)₂)—S—CH₂—[C₆H₅] | O=C(—[C₆H₄]—NH₂)—S—CH₂—[C₆H₅] | Na—S—C(=S)—O—CH(CH₃)₂ |
| 30 | (CH₃)₂CH—O—C(=S)—S—[C₆H₄]—C(=O)—O—CH₂—CH₂—CH₂—O—C(=O)—[C₆H₄]—S—C(=S)—O—CH(CH₃)₂ | H₂N—[C₆H₄]—C(=O)—O—CH₂—CH₂—CH₂—O—C(=O)—[C₆H₄]—NH₂ | Na—S—C(=S)—O—CH(CH₃)₂ |

Generally the procedure of Example 1 has also been used to diazotize methyl anthranilate and to react the resulting diazonium cations with a potassium isopropylxanthate solution, using various solvents other than chloroform. Yield data for the reaction, in typical solvents, are presented in Table II, below:

TABLE II

Production of isopropylxanthate esters in various solvents

| Ex. No. | Solvent | Total yield* | Percent of o-methoxy-carbonyl-phenyl isopropyl-xanthate | Percent of dithio-carbonate |
|---|---|---|---|---|
| 34 | Carbon tetrachloride | 103.2 | 66.0 | 37.2 |
| 35 | 1,1,2,2-tetrachloroethane | 95.4 | 70.1 | 25.3 |
| 36 | 1,1,2-trichloroethane | 107.2 | 79.3 | 27.9 |
| 37 | 1,1,2,2-tetrachloroethylene | 97.1 | 66.2 | 30.9 |
| 38 | Hexane | 87.3 | 59.7 | 27.6 |
| 39 | Methyl isobutyl ketone | 94.3 | 94.3 | 0 |
| 40 | Methyl ethyl ketone | 83.4 | 62.1 | 22.0 |
| 41 | Butyl acetate | 103.6 | 78.7 | 24.9 |
| 42 | 1,1-dichloroethane | 88.5 | 56.6 | 31.9 |
| 43 | Dichloromethane | 80.3 | 47.7 | 32.6 |
| 44 | Isopropyl ether | 72.58 | 56.48 | 22.09 |

*All percentages are based on theoretical yield of o-methoxycarbonylphenyl isopropylxanthate from the initial weight of methyl anthranilate. The overtheoretical yields are caused by the presence in the final product of small amounts of bis(isopropoxythiocarbonyl) disulfide derived by oxidation from the excess xanthate used in the reactions.

Xanthate, alkylene dixanthate, di- and trithiocarbonate, or disulfide esters of other benzoic acid esters can be produced in the manner described by using other benzenediazonium chloride solutions having the general formula

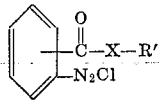

wherein X and R' have the meanings indicated above. Such diazonium salt solutions can be produced, in the manner described above, from aminobenzoic acid esters and thio esters having the general formula

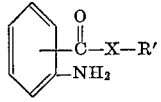

wherein X and R' have the meanings indicated above. Such aminobenzoic acid esters and thio esters can be produced [5] in a known manner by a reaction between an aminobenzoic acid and alcohols, thiols, phenols, thiophenols, and the like, having the general formula R' X H.

The dixanthate esters are produced in a similar manner from benzenediazonium salt solutions having the general formula

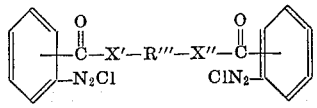

wherein X', X", and R''' have the meanings indicated above. The above diazonium salt solutions are formed from the corresponding di-aminobenzoic acid esters and thio esters by diazotization. The diaminobenzoic acid esters and thio esters can be produced in a known manner by reaction between an aminobenzoic acid and glycols, dithiols, and hydroxyalkylenemercaptans having the general formula H—X'—R'''—X"—H, wherein X', X", and R''' have the meanings indicated above.

---

[5] See, for example, German Patent 110,386 (1898) and H. Meyer, Monatsh. Chem., 1904, vol. 25, page 1201.

Some di-aminobenzoic acid esters which have been produced include:

| | |
|---|---|
| 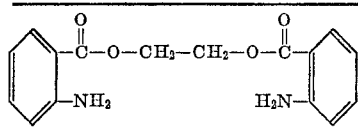 | Ethylene glycol dianthranilate. |
| 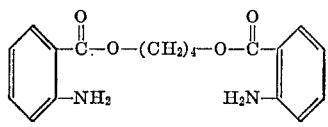 | 1,4-butanediol dianthranilate. |
| 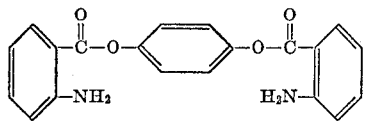 | Hydroquinone dianthranilate. |
| 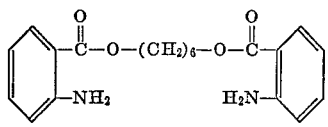 | 1,6-hexanediol dianthranilate. |
| 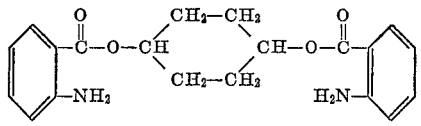 | 1,4-cyclohexanediol dianthranilate. |
| 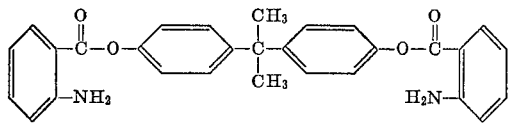 | 4,4'-isopropylidene-diphenol dianthranilate (Bis-phenol-A dianthranilate). |

Many such o-aminobenzoic acid esters and thio esters and the di-aminobenzoic acid esters and thio esters described above are disclosed either specifically or generally in U.S. Pat. 3,123,631, together with a preferred method for producing such compounds using isatoic anhydride as a starting material.

Because of the facility with which the o-aminobenzoic acid esters and thio esters and the di-(o-aminobenzoic acid esters and thio esters) can be produced by this method, the diazonium salts which are formed therefrom constitute a preferred family of starting materials for practicing the instant invention, and the corresponding xanthate, alkylenedixanthate, di- and trithiocarbonate dixanthate and disulfide esters constitute preferred families of final products. Such families are also preferred for the further reason that they are peculiarly useful as chemical intermediates. Still other xanthate and dixanthate esters can be produced by substituting for the xanthate and dixanthate solutions in the examples, a solution of a salt of another xanthic or dixanthic acid having the general formulas respectively:

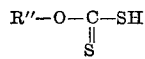

wherein R'' has the meaning set forth above,

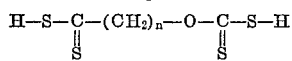

wherein $n$ is an integer from 2 through 8, or by making such substitution and additionally substituting other benzenediazonium chloride solutions as discussed above. Numerous such xanthate and dixanthate salts are disclosed in the literature [6], and all others can be produced by a known reaction [7]. It should be noted that, in the production of xanthate and dixanthate esters, in many cases there will be produced variable amounts of dithiocarbonate and small amounts of thiocarbonyl disulfides in addition to the desired xanthate or alkylenedixanthate esters.

The dithiocarbonate esters are probably formed by attack on the thiocarbonyl double bond by the xanthate ester product by the carbonium ion generated from the diazonium compound.[8]

The thiocarbonyl disulfide is probably formed from the excess xanthate used in the reaction by oxidation with the diazonium compound itself which is reduced to the corresponding benzoic acid ester, and less significantly by air.[9]

Other alkylenedixanthate esters can be produced in the manner described in Example 3 by substituting other diazonium chloride solutions, as discussed above, for the o-methoxycarbonylphenyldiazonium chloride solution of the example or by substituting other alkylenedixanthate salts for the dipotassium ethylenedixanthate.

It will be apparent that a critical step according to the method of the invention involves the reaction, in the presence of a suitable organic solvent for the final organic sulfur product, as discussed above, between an aromatic diazonium cation free of hydrophilic groups and an anion of a xanthate acid ester having the general formula

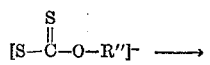

an anion of an alkylenedixanthate having the general formula

---

[6] See, for example, Organic Reactions, vol. XII, John Wiley & Sons, Inc., New York and London, 1962, pages 57–101.
[7] See, for example, Methoden der Org. Chemie, Band 9, Houben Weyl, 1955, pages 810 to 812, and references cited.
[8] See, for example, General Formation of Aryl Dithiocarbonates and Ethyl Ethylxanthate in the Leuckart Thiophenol Synthesis-James R. Cox, Jr., Casimir L. Gladys, Lamar Field and D. E. Pearson. J. Organic Chem., vol. 25, pp. 1083.
[9] See, for example, Reid, Organic Chemistry of Bivalent Sulfur, Chemical Publishing Co., Inc., vol. IV, 1962, pp. 151–153.

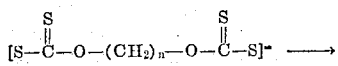

a trithiocarbonate anion having the general formula

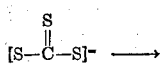

or a disulfide anion having the general formula $$[S-S]^-\longrightarrow$$

The actual source for the cations and anions is immaterial insofar as the instant invention is concerned, so long as the source provides the cations and anions under the conditions of the reaction. In general, the alkali metal salts of the indicated sulfur donor compounds are sufficiently soluble, but not the free acids. Similarly, the diazonium salts of mineral acids generally have sufficient solubility. In its essential details, this step of the invention comprises vigorously agitating a reaction mixture, at a temperature from about 20° C. to about 90° C., comprising an aqueous phase including aromatic diazonium cations free of hydrophilic groups and xanthate anions, alkylenedixanthate anions, trithiocarbonate anions or disulfide anions having the formulas, respectively:

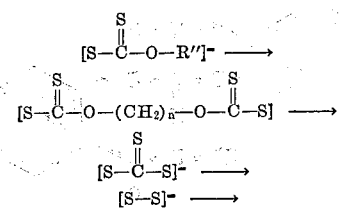

and an organic solvent for the final xanthate, di- or trithiocarbonate, alkylenedixanthate, dixanthate or disulfide esters, which is substantially unreactive with the cations, the anions, and the final ester product and has limited solubility in water, and wherein the organic solvent is present in an amount sufficient to dissolve substantially all of the final ester products as they are formed. In practice, for example, this step can be carried out by vigorously agitating, at a temperature within the indicated range, an aqueous solution of one of the aromatic diazonium salts as set forth herein and of a xanthate salt, of an alkylenedixanthate salt, of a trithiocarbonate salt, or of a disulfide salt.

It will be apparent that various changes and modifications can be made from the details specifically set forth herein without departing from the spirit and scope of the invention as defined in the appended claims.

What I claim is:

1. A method for producing an organic sulfur compound, said method including the step of vigorously agitating a reaction mixture comprising an aqueous phase including aromatic diazonium cations having the general formula

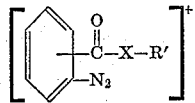

or

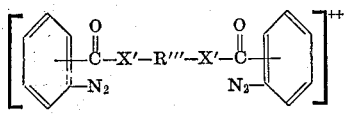

wherein each of X and X' is oxygen or sulfur, R' represents a straight or branched chain acyclic alkyl group having not more than 12 carbon atoms, wherein the carbon bonded to X is also bonded to at least one hydrogen; cyclohexyl; a straight or branched chain acyclic alkenyl or alkynyl group having about 3 carbon atoms, wherein the carbon bonded to X is also bonded to at least one hydrogen; a hydrocarbyl aryl-alkyl group having about 7 carbon atoms; a 2-methoxy-ethyl group; or phenyl; and R''' represents a p-phenylene group, a 4,4'-isopropylidene diphenyl group, a 1,4-cyclohexyl group, or an alkylene group having from 2 to 6 carbon atoms, and anions selected from the group consisting of xanthate anions having the general formula

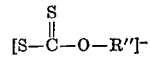

alkylene dixanthate anions having the general formula

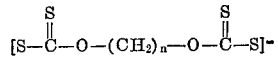

trithiocarbonate anions having the general formula

and disulfide anions having the general formula $$[S-S]^-$$

wherein $n$ is an integer from 2 through 8, inclusive, and R'' represents a straight or branched chain, cyclic or acyclic alkyl group having not more than 12 carbon atoms, wherein the carbon bonded to oxygen is also bonded to at least one hydrogen; a straight or branched chain, acyclic alkenyl or alkynyl group having not more than 12 carbon atoms, wherein the carbon bonded to oxygen is also bonded to at least one hydrogen; a hydrocarbyl arylalkyl group having from 7 to 12 carbon atoms; a hydrocarbyl aryl-sec-alkyl group having from 8 to 12 carbon atoms or a 2-alkoxyethyl group having from 3 to 8 carbon atoms; and an organic solvent for the sulfur compound, which solvent is substantially unreactive with said cations, with said anions, and with the sulfur compound and which has limited solubility in water, the amount of the solvent being sufficient to form a separate organic phase in which substantially all of the final product is dissolved as it is formed, said reaction being carried out at a temperature ranging from 20 to 90° C.

2. A method as claimed in claim 1 wherein the solvent is one which is a liquid under the reaction conditions.

3. A method as claimed in claim 2 wherein the solvent is selected from the group consisting of methylene chloride, chloroform, carbon tetrachloride, 1,1,2-trichloroethane, 1,1,1-trichloroethane, chloroethane, hexachloroethane, 1,1,2-trichloroethylene, trichlorobenzenes, dichloro toluenes, 1,1,2,2-tetrachloroethylene, 1,1-dichloroethane, 1,2-dichloroethane, hexane, methyl isobutyl ketone, methyl ethyl ketone, butyl acetate, and isopropyl ether, and the amount thereof is from about 2 to about 15 milliliters per gram of the final sulfur compound, assuming a theoretical yield.

4. A method as claimed in claim 3 wherein the solvent is one which has a boiling point no greater than the thermal decomposition temperature of the final sulfur compound.

5. A method as claimed in claim 3 wherein the diazonium cations have the general formula

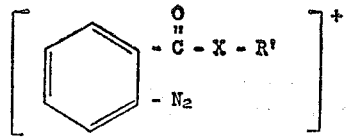

wherein X is oxygen or sulfur, and R' represents a straight or branched chain acyclic alkyl group having not more than 12 carbon atoms, wherein the carbon bonded to oxygen or sulfur is also bonded to at least one hydrogen; cyclohexyl; a straight or branched chain acyclic alkenyl or alkynyl group having about 3 carbon atoms, wherein the carbon bonded to oxygen or sulfur is also bonded to at least one hydrogen; an aryl-alkyl group having about 7 carbon atoms; a 2-methoxyethyl group; or phenyl, and the anions reacted therewith are disulfide anions.

6. An organic sulfur compound selected from the group consisting of xanthate esters having the general formula

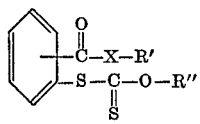

alkylenedixanthate esters having the general formula

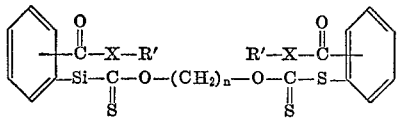

thiocarbonate esters having the general formula

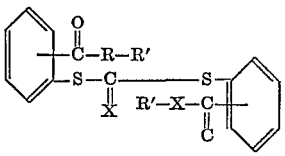

and bidixanthate esters having the general formula

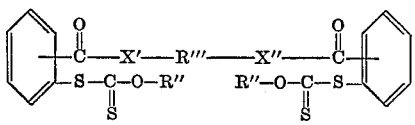

wherein $n$ is an integer from 2 through 8, inclusive, X, X′ and X″ can be the same or different and each represents oxygen or sulfur, R′ and R″ can be the same or different, R′ represents a straight or branched chain acyclic alkyl group having not more than 12 carbon atoms, wherein the carbon bonded to oxygen or sulfur is also bonded to at least one hydrogen; a straight or branched chain cyclic alkyl group having about 6 carbon atoms wherein the carbon bonded to oxygen or sulfur is also bonded to at least one hydrogen; a straight or branched chain acyclic alkenyl or alkynyl group having about 3 carbon atoms, wherein the carbon bonded to oxygen or sulfur is also bonded to at least one hydrogen; an aryl-alkyl group having from 7 to 12 carbon atoms; an aryl-sec-alkyl group having from 8 to 12 carbon atoms; an alkaryl group having from 7 to 12 carbon atoms; a 2-alkoxyethyl group having from 3 to 8 carbon atoms; phenyl; or naphthyl; and R″ represents a straight or branched chain acyclic alkyl group having not more than 12 carbon atoms, wherein the carbon bonded to oxygen is also bonded to at least one hydrogen; a straight or branched chain cyclic alkyl group having about 6 carbon atoms wherein the carbon bonded to oxygen or sulfur is also bonded to at least one hydrogen; a straight or branched chain, acyclic alkenyl or alkynyl group having about 3 carbon atoms, wherein the carbon bonded to oxygen is also bonded to at least one hydrogen; an aryl-alkyl group having from 7 to 12 carbon atoms; an aryl-sec-alkyl group having from 8 to 12 carbon atoms or a 2-alkoxyethyl group having from 3 to 8 carbon atoms; and R‴ represents a p-phenylene group, a 4,4′-isopropylidenediphenyl group, a 1,4-cyclohexyl group, or an alkylene group having from 2 to 6 carbon atoms.

7. An organic sulfur compound which is a xanthate ester having the general formula

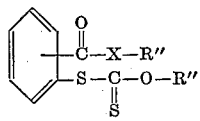

wherein X represents oxygen or sulfur, R′ and R″ can be the same or different, R′ represents a straight or branched chain acyclic alkyl group having not more than 12 carbon atoms, wherein the carbon bonded to oxygen or sulfur is also bonded to at least one hydrogen; a straight or branched chain cyclic alkyl group having about 6 carbon atoms wherein the carbon bonded to oxygen or sulfur is also bonded to at least one hydrogen; a straight or branched chain acyclic alkenyl or alkynyl group having about 3 carbon atoms, wherein the carbon bonded to oxygen or sulfur is also bonded to at least one hydrogen; an aryl-alkyl group having from 7 to 12 carbon atoms; an aryl-sec-alkyl group having from 8 to 12 carbon atoms; an alkaryl group having from 7 to 12 carbon atoms; a 2-alkoxyethyl group having from 3 to 8 carbon atoms; phenyl; or naphthyl; and R″ represents a straight or branched chain acyclic alkyl group having not more than 12 carbon atoms, wherein the carbon bonded to oxygen is also bonded to at least one hydrogen; a straight or branched chain cyclic alkyl group having about 6 carbon atoms wherein the carbon bonded to oxygen or sulfur is also bonded to at least one hydrogen; a straight or branched chain, acyclic alkenyl or alkynyl group having about 3 carbon atoms, wherein the carbon bonded to oxygen is also bonded to at least one hydrogen; an aryl-alkyl group having from 7 to 12 carbon atoms; an aryl-sec-alkyl group having from 8 to 12 carbon atoms or a 2-alkoxyethyl group having from 3 to 8 carbon atoms.

8. An organic sulfur compound which is a thiocarbonate ester having the general formula

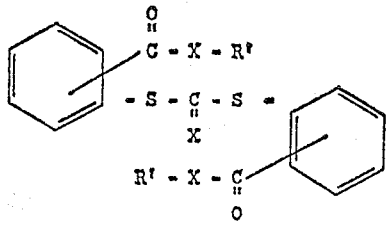

wherein X is oxygen or sulfur, and R′ represents a straight or branched chain acyclic alkyl group having not more than 12 carbon atoms, wherein the carbon bonded to oxygen or sulfur is also bonded to at least one hydrogen; a straight or branched chain cyclic alkyl group having about 6 carbon atoms wherein the carbon bonded to oxygen or sulfur is also bonded to at least one hydrogen; a straight or branched chain acyclic alkenyl or alkynyl group having about 3 carbon atoms, wherein the carbon bonded to oxygen or sulfur is also bonded to at least one hydrogen; an aryl-alkyl group having from 7 to 12 carbon atoms; a 2-alkoxyethyl group having from 3 to 8 carbon atoms; phenyl; naphthyl; an aryl-sec-alkyl group having from 8 to 12 carbon atoms; or an alkaryl group having from 7 to 12 carbon atoms.

9. An organic sulfur compound which is an alkylenedixanthate ester having the general formula

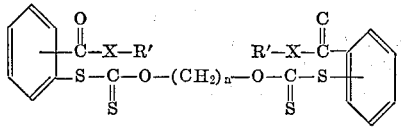

wherein $n$ is an integer from 2 through 8, inclusive, X represents oxygen or sulfur, R′ represents a straight or branched chain acyclic alkyl group having not more than 12 carbon atoms, wherein the carbon bonded to oxygen or sulfur is also bonded to at least one hydrogen; a straight or branched chain cyclic alkyl group having about 6 carbon atoms wherein the carbon bonded to oxygen or sulfur is also bonded to at least one hydrogen; a straight or branched chain acyclic alkenyl or alkynyl group having about 3 carbon atoms, wherein the carbon bonded to oxygen or sulfur is also bonded to at least one hydrogen; an aryl-alkyl group having from 7 to 12 carbon atoms; an aryl-sec-alkyl group having from 8 to 12 carbon atoms; an alkaryl group having from 7 to 12 carbon atoms; a 2-alkoxyethyl group having from 3 to 8 carbon atoms; phenyl; or naphthyl.

10. An organic sulfur compound which is a xanthate ester having the general formula

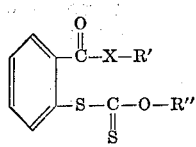

wherein X represents oxygen or sulfur, R' and R'' can be the same or different, R' represents a straight or branched chain acyclic alkyl group having not more than 12 carbon atoms, wherein the carbon bonded to oxygen or sulfur is also bonded to at least one hydrogen; a straight or branched chain cyclic alkyl group having about 6 carbon atoms wherein the carbon bonded to oxygen or sulfur is also bonded to at least one hydrogen; a straight or branched acyclic alkenyl or alkynyl group having about 3 carbon atoms, wherein the carbon bonded to oxygen or sulfur is also bonded to at least one hydrogen; an aryl-alkyl group having from 7 to 12 carbon atoms; an aryl-sec-alkyl group having from 8 to 12 carbon atoms; an alkaryl group having from 7 to 12 carbon atoms; a 2-alkoxyethyl group having from 3 to 8 carbon atoms; phenyl; or naphthyl; and R'' represents a straight or branched chain acyclic alkyl group having not more than 12 carbon atoms, wherein the carbon bonded to oxygen is also bonded to at least one hydrogen; a straight or branched chain cyclic alkyl group having about 6 carbon atoms wherein the carbon bonded to oxygen or sulfur is also bonded to at least one hydrogen; a straight or branched chain, acyclic alkenyl or alkynyl group having about 3 carbon atoms, wherein the carbon bonded to oxygen is also bonded to at least one hydrogen, an aryl-alkyl group having from 7 to 12 carbon atoms; an aryl-sec-alkyl group having from 8 to 12 carbon atoms, or a 2-alkoxyethyl group having from 3 to 8 carbon atoms.

11. An organic sulfur compound which is a thiocarbonate ester having the general formula

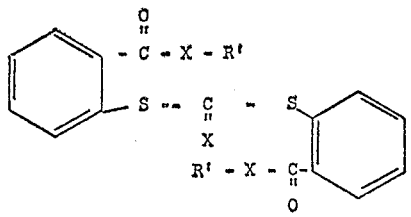

wherein X is oxygen or sulfur, and R' represents a straight or branched chain acyclic alkyl group having not more than 12 carbon atoms, wherein the carbon bonded to oxygen or sulfur is also bonded to at least one hydrogen; a straight or branched chain cyclic alkyl group having about 6 carbon atoms wherein the carbon bonded to oxygen or sulfur is also bonded to at least one hydrogen; a straight or branched chain acyclic alkenyl or alkynyl group having about 3 carbon atoms, wherein the carbon bonded to oxygen or sulfur is also bonded to at least one hydrogen; an aryl-alkyl group having from 7 to 12 carbon atoms; a 2-alkoxyethyl group having from 3 to 8 carbon atoms; phenyl; naphthyl; an aryl-sec-alkyl group having from 8 to 12 carbon atoms; or an alkaryl group having from 7 to 12 carbon atoms.

12. An organic sulfur compound which is an alkylene-dixanthate ester having the general formula

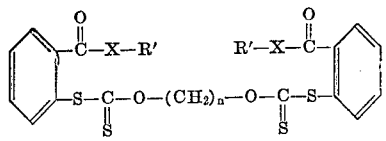

wherein $n$ is an integer from 2 through 8, inclusive X represents oxygen or sulfur, R' represents a straight or branched chain acyclic alkyl group having not more than 12 carbon atoms, wherein the carbon bonded to oxygen or sulfur is also bonded to at least one hydrogen; a straight or branched chain cyclic alkyl group having about 6 carbon atoms wherein the carbon bonded to oxygen or sulfur is also bonded to at least one hydrogen; a straight or branched chain acyclic alkenyl or alkynyl group having about 3 carbon atoms, wherein the carbon bonded to oxygen or sulfur is also bonded to at least one hydrogen; an aryl-alkyl group having from 7 to 12 carbon atoms; an aryl-sec-alkyl group having from 8 to 12 carbon atoms; an alkaryl group having from 7 to 12 carbon atoms; a 2-alkoxyethyl group having from 3 to 8 carbon atoms; phenyl; or naphthyl.

13. An organic sulfur compound which is an ethylene-dixanthate ester having the general formula

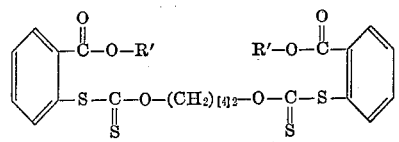

wherein R' represents a primary alkyl group having from 1 to 12 carbon atoms.

14. An organic sulfur compound which is a dixanthate ester having the general formula

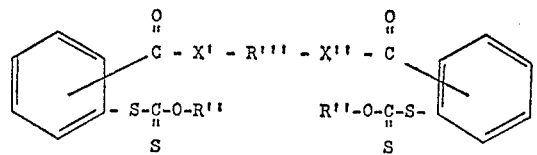

wherein X' and X'' can be the same or different and each represents oxygen or sulfur; R'' represents a straight or branched chain acyclic alkyl group having not more than 12 carbon atoms, wherein the carbon bonded to oxygen is also bonded to at least one hydrogen; a straight or branched chain cyclic alkyl group having about 6 carbon atoms wherein the carbon bonded to oxygen is also bonded to at least one hydrogen; a straight or branched chain, acyclic alkenyl or alkynyl group having about 3 carbon atoms, wherein the carbon bonded to oxygen is also bonded to at least one hydrogen; an aryl-alkyl group having from 7 to 12 carbon atoms; an aryl-sec-alkyl group having from 8 to 12 carbon atoms or a 2-alkoxyethyl group having from 3 to 8 carbon atoms; and R''' is a p-phenylene group, an alkylene group having from 2 to 6 carbon atoms, a 4,4'-isopropylidenediphenyl group or a 1,4-cyclohexyl group.

15. An organic sulfur compound which is dixanthate ester having the general formula

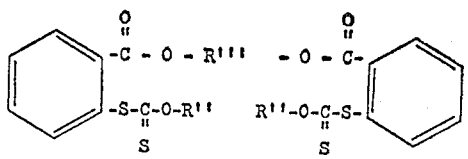

wherein R'' is a sec-alkyl group having from 3 to 12 carbon atoms, and R''' is a p-phenylene group, a 4,4'-isopropylidenediphenyl group, a 1,4-cyclohexyl group, or an alkylene group having from 2 to 6 carbon atoms.

16. An organic sulfur compound which is a xanthate ester having the general formula

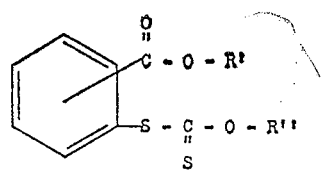

wherein R' is a primary alkyl group having from 1 to 12 carbon atoms, and R'' is a sec-alkyl group having from 3 to 12 carbon atoms.

17. An organic sulfur compound which is a xanthate ester having the general formula

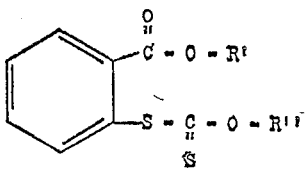

wherein R' is a primary alkyl group having from 1 to 12 carbon atoms, and R'' is a sec-alkyl group having from 3 to 12 carbon atoms.

18. A dithiocarbonate ester having the formula

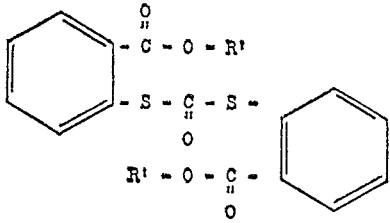

wherein R' represents a primary alkyl group having from 1 to 12 carbon atoms.

19. An organic sulfur compound which is a trithiocarbonate ester having the general formula

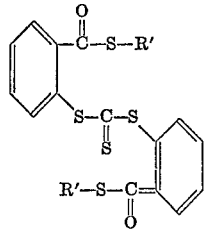

wherein R' represents a primary alkyl group having from 1 to 12 carbon atoms.

20. An organic sulfur compound which is a xanthate ester having the general formula

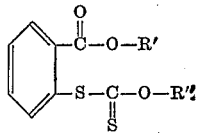

wherein R' is a primary alkyl group having from 1 to 12 carbon atoms, and R'' is a primary alkyl group having from 1 to 12 carbon atoms.

References Cited

UNITED STATES PATENTS

| | | | |
|---|---|---|---|
| 1,706,489 | 3/1929 | Hoffa et al. | 260—609 |
| 2,327,985 | 8/1943 | Alderman et al. | 260—454 |
| 3,437,666 | 4/1969 | Pfugfelder et al. | 260—454 |
| 2,667,503 | 1/1954 | Senn | 260—301 |

OTHER REFERENCES

Cox et al., "Journal of Organic Chemistry", vol. 25 (1960), pp. 1083–92.

Saunders, "The Aromatic Diazo Compounds and Their Tech. Applications" (1949), pp. 324–326.

Moshkovich et al., "Attenuation of the Explosive Decomposition of Diacetylene By Inert Diluents" (1965) CA 62 p. 14475 (1965).

Boucart et al., "Inhibition of the Methane-Air Reaction by Organic Halogen Ders." (1965), CA 65 p. 15139 (1966).

LEWIS GOTTS, Primary Examiner

G. HOLLRAH, Assistant Examiner

260—141, 455 C, 470, 471 R, 608; 424—301, 308

U.S. Cl. X.R.